United States Patent
Truetken

(10) Patent No.: US 6,982,973 B2
(45) Date of Patent: *Jan. 3, 2006

(54) MULTIMEDIA INTERFACE FOR IP TELEPHONY

(75) Inventor: John L. Truetken, McKinney, TX (US)

(73) Assignee: MCI, Inc., Ashburn, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/303,342

(22) Filed: Nov. 22, 2002

(65) Prior Publication Data

US 2003/0067887 A1 Apr. 10, 2003

Related U.S. Application Data

(63) Continuation of application No. 09/280,732, filed on Mar. 29, 1999, now Pat. No. 6,493,324.

(51) Int. Cl.
*H04L 12/66* (2006.01)

(52) U.S. Cl. ............ 370/352; 370/410; 370/261
(58) Field of Classification Search ......... 370/261–262, 370/352–356, 493–495, 410; 709/227–229, 709/204; 379/158, 206.01, 205.01, 88.11–88.14, 379/88.16–88.17, 93.21
See application file for complete search history.

(56) References Cited

U.S. PATENT DOCUMENTS

| | | | | |
|---|---|---|---|---|
| 5,946,386 A | * | 8/1999 | Rogers et al. | 379/265.09 |
| 6,072,780 A | * | 6/2000 | Johnson et al. | 370/260 |
| 6,243,373 B1 | | 6/2001 | Turock | |
| 6,289,025 B1 | | 9/2001 | Pang et al. | |
| 6,292,480 B1 | | 9/2001 | May | |
| 6,298,045 B1 | * | 10/2001 | Pang et al. | 370/261 |
| 6,311,231 B1 | | 10/2001 | Bateman et al. | |
| 6,324,265 B1 | | 11/2001 | Christie et al. | |
| 6,330,243 B1 | | 12/2001 | Strandberg | |
| 6,335,927 B1 | * | 1/2002 | Elliott et al. | 370/352 |
| 6,337,858 B1 | | 1/2002 | Petty et al. | |
| 6,445,694 B1 | * | 9/2002 | Swartz | 370/352 |
| 6,493,324 B1 | * | 12/2002 | Truetken | 370/261 |

OTHER PUBLICATIONS

Civanlar, M.R. et al., "IP–Networked Multimedia Conferencing", IEEE Signal Processing Magazine, Jul. 2000, pp. 31–43.

Vlacovic, B. et al., "Packet Based Telephony", IEEE Feb. 2001, pp. 210–213.

Wright, S. et al., "IP Telephony vs. ATM: What is There to Discuss?", IEEE Feb. 1998, pp. 400–409.

Fieldler, P. et al., "Voice and Multi–Fractal Data in the Internet", IEEE Feb. 2001, pp. 426–431.

* cited by examiner

*Primary Examiner*—Chi Pham
*Assistant Examiner*—Thai Hoang

(57) ABSTRACT

An IP telephony client initiates and manages multimedia sessions. The client includes a user interface, an application interface, and a protocol stack. The application interface provides an interface between the protocol stack and the user interface and helper applications. The protocol stack packages messages received from the application interface and parses messages received from other parties or prospective parties. The application interface converts incoming messages to appropriate application programming interfaces (APIs) and sends incoming payloads to the appropriate helper application.

22 Claims, 5 Drawing Sheets

MULTIMEDIA INTERFACE FOR IP TELEPHONY

CROSS REFERENCE TO RELATED APPLICATIONS

This application is a continuation of U.S. application Ser. No. 09/280,732, entitled "Multimedia Interface for IP Telephony", filed on Mar. 29, 1999 now U.S. Pat. No. 6,493,324.

FIELD OF THE INVENTION

The present invention relates generally to the field of Internet telephony, and more particularly to a client for initiating and managing multimedia Internet telephony sessions.

DESCRIPTION OF THE PRIOR ART

Internet telephony, which is also known as IP telephony, provides realtime delivery of voice and other data types between two or more parties across networks using Internet protocols. IP telephony relies on end-to-end transport of information rather than the connections and circuits of the traditional switched telephone system. Call set-up is performed in IP telephony directly between the parties, rather than between the parties and the network. All information related to the call, both the call data itself and signaling, is transported end-to-end across the Internet without setting up dedicated circuits and connections. Information is transported across the Internet in packets that are type and media independent, so separate voice, data, and signaling networks are unnecessary. Additionally, packets may be either unicast or multicast, which allows multiparty calls to be made easily.

IP telephony thus offers a number of advantages over traditional circuit switched system. There is a need for an improved system to enable callers to obtain the benefits that IP telephony offers.

SUMMARY OF THE INVENTION

The present invention provides a multimedia IP telephony client, which provides a method of and system for initiating and managing multimedia IP telephony sessions. The client of the present invention allows helper applications, such as WEB phone, chat. conferencing, and streaming video, to be integrated in a seamless way. The client of the present invention includes a user interface, an application interface, and a protocol stack. The application interface provides an interface between the protocol stack and the user interface and helper applications. The protocol stack packages messages received from the application interface and parses messages received from other parties or prospective parties. The application interface converts incoming messages to appropriate application programming interfaces (APIs) and sends incoming payloads to the appropriate helper application.

The system of the present invention initiates and manages IP telephony sessions between a calling party client and at least one called party client by displaying a call placement dialog on the user interface of the calling party client whenever a user wishes to initiate a session. The call placement dialog includes fields for designating the called party client and a medium for the session. The calling party transmits a session invitation message to the called party client. The session invitation identifies the calling party client and the designated medium. The called party client displays an invitation dialog on its user interface. The invitation dialog identifies the calling party client and the designated medium.

The invitation dialog includes user input controls for accepting the invitation, declining the invitation, and choosing other options. If the user of the called party client accepts the invitation, the called party client transmits an acceptance response to the calling party client. Upon acceptance of the invitation, a session in the designated medium is established between the calling party client and the called party client by launching the appropriate helper application for the designated medium at each calling party client and called party client.

If the user of the called party client selects the other options control of the invitation dialog, the called party client displays an other options dialog. The other options dialog includes user input controls for suggesting alternative media or an alternative time for the session. The other options dialog displays a list of alternative media available to called party client. If the called party client user selects the control for suggesting alternative media, the called party client transmits a response to the calling party client with the suggested alternative media for the session. The calling party client displays the suggested alternative media. If the calling party user selects a suggested alternative medium, a session is established in the selected suggested alternative medium.

If the called party client user enters an alternative time for the session into the other options dialog, the called party client transmits an invitation declined response back to the calling party client with a suggested alternative time for session. The calling party client displays a message that the invitation has been declined and that an alternative time for the session has been suggested.

DESCRIPTION OF THE PREFERRED EMBODIMENT

Figure 1:
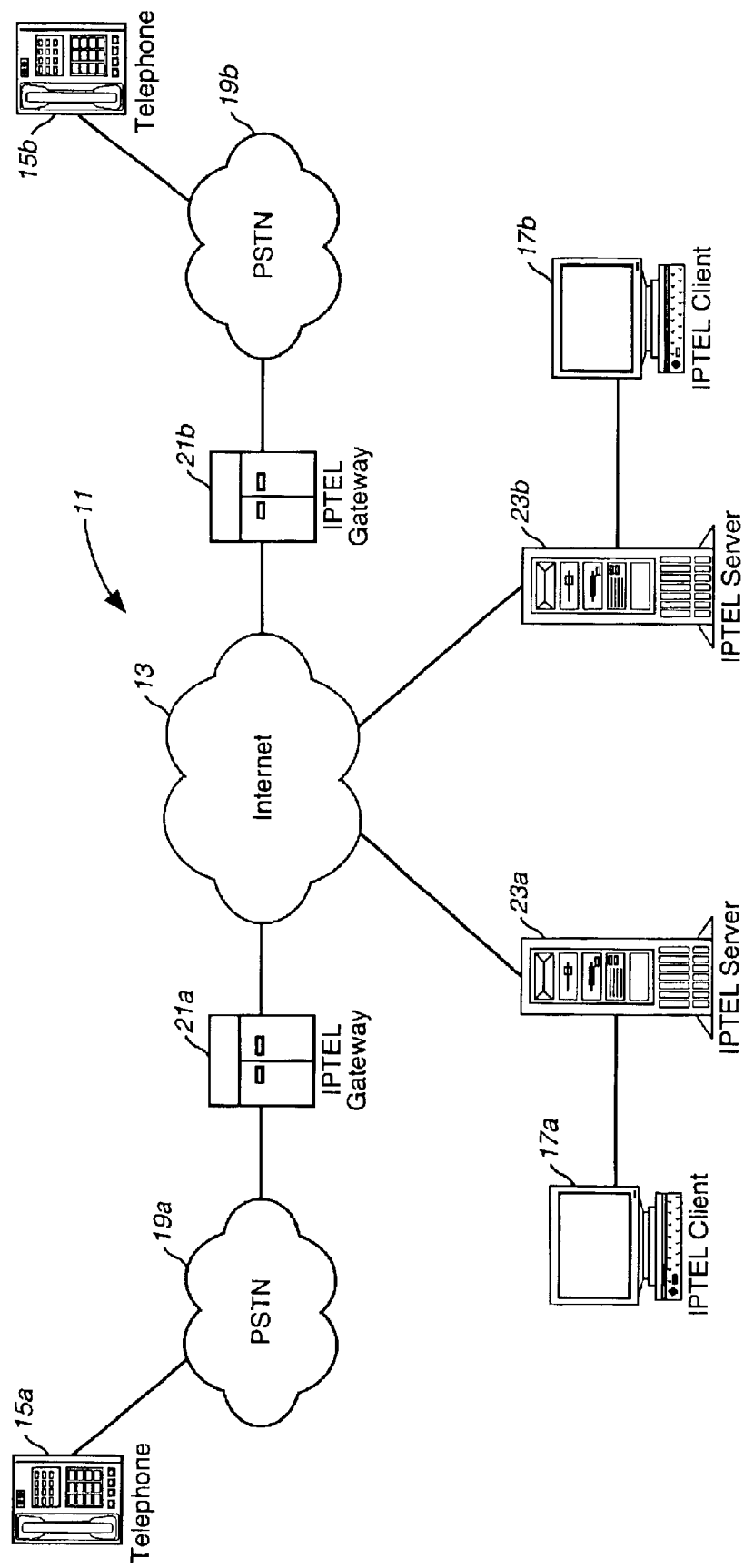
FIG. 1 is a block diagram of a system according to the present invention.

Referring now to the drawings, and first to FIG. 1, an IP telephone system is designated by the numeral 11. In system 11, at least a portion of a call is transported over the Internet, indicated generally at 13. Calls may be between or among traditional telephones 15 and Internet telephony client machines 17.

Traditional telephones 15 are connected to Internet 13 through traditional public switched telephone Networks 19 and IP telephony gateways 21. IP telephony client machines are networked with servers 23 that are connected to Internet 13.

The method and system of the present invention provides for call set-up and management between callers using both IP telephony client machines 17 and traditional telephones 15, as well as other telephone like devices. User interaction with IP telephony client machines 17 is enabled by a graphical user interface, which will be described in detail hereinafter. User interaction for call set-up and the like is provided to callers using traditional telephones 15 by means of a voice response units (VRUs) at IP telephony gateways 21.

Figure 2:
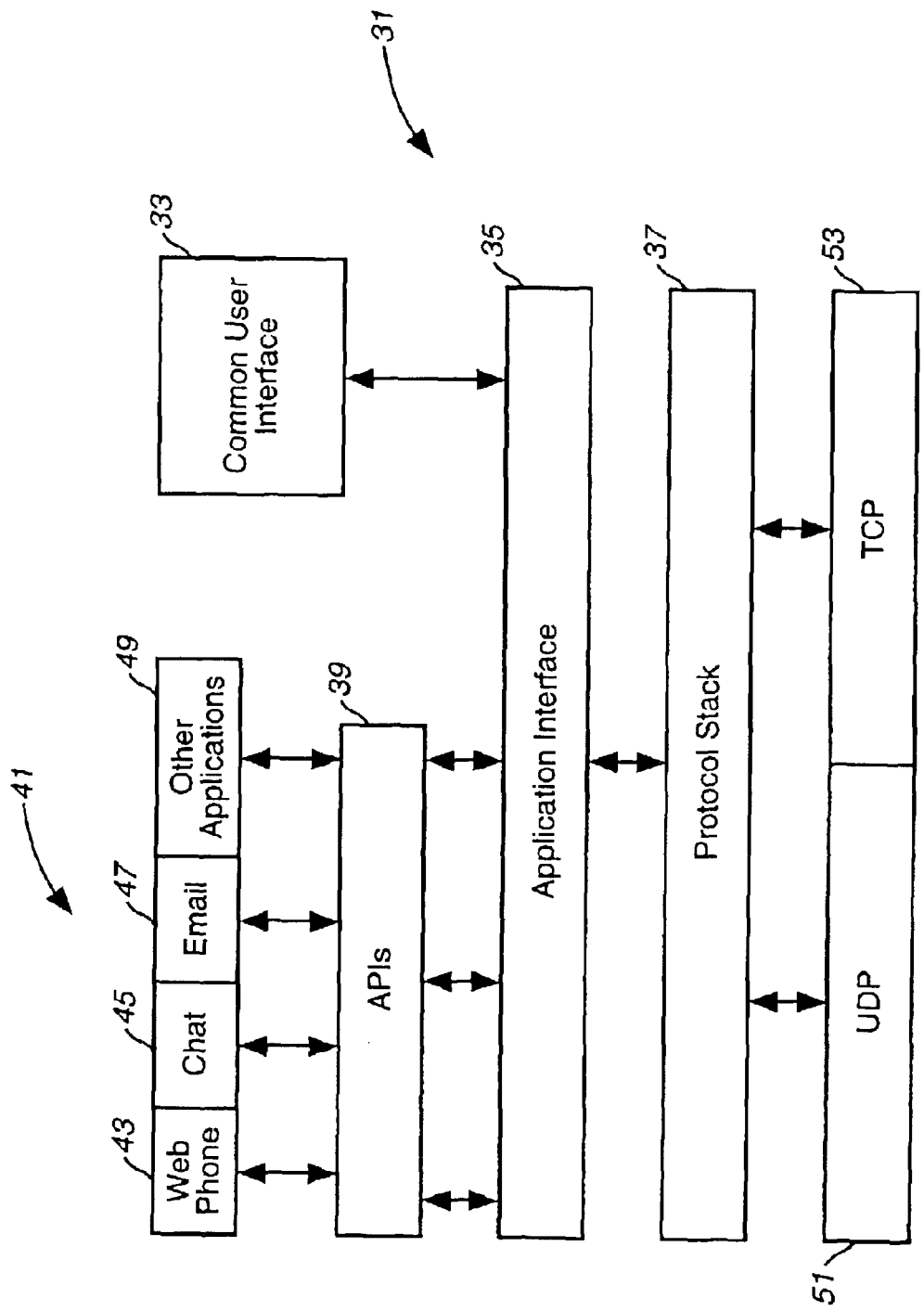
FIG. 2 is a block diagram of a client according to the present invention.

Referring now to FIG. 2, there is shown a logical block diagram of an IP telephony client according to the present invention, which is designated as 31. IP telephony client 31 may be implemented in the IP telephony client machine 17 or the IP telephony gateway 21 of FIG. 1. IP telephony client generally includes a common user interface 33 that communicates with an application interface 35. The application interface 35 sits between a protocol stack 37, which in the preferred embodiment is a session initiation protocol (SIP) stack, and a set application programing interfaces (APIs) 39. IP telephony client 31 includes one or more helper applications, indicated generally as 41. Helper applications 41 may include a web phone application 43, a chat application 45, an e-mail application 47, and other applications, such as streaming video, conferencing applications, and the like indicated at 49.

The common user interface 33 gives a caller the ability to communicate with IP telephony client 31. In an embodiment in the present invention, the common user interface 33 may be an HTML browser or a graphical user interface implemented in another graphical environment, such as Windows98. As will be explained in detail hereinafter, the graphical common user interface allows a user to initiate or respond to a call or session request, and make alternate choices based upon information provided by the other party. The common user interface 33 also provides information to the user, such as caller ID, incoming call authorization, or alternate direction. In the standard telephone embodiment of the system of the present invention, the common user interface 33 is provided by a voice response unit (VRU) provide at the IP telephony gateway 21, FIG. 1. The VRU interface allows public switched telephone users to receive the same services and make the same choices as a computer client connected directly to the Internet.

The protocol stack 37 is written to initiate and parse SIP messages initiated by the application interface 35 and received from prospective callers. The protocol stack 37 is a standard implementation using standard protocol design. The protocol stack 37 communicates with the Internet by user datagram protocol (UDP) 51 or transmission control protocol (TCP) 53.

The application interface 35 converts incoming messages to appropriate application APIs using parameters in a configuration file for each helper application. Similarly, application interface passes information received from helper applications 41 and the common user interface 33 to the protocol stack 37.

A call is identified by a unique SIP call ID. A session within a call is identified by session description protocol (SDP) session ID. After a session has been established, the application interface 35 uses the SIP call ID and the SDP session ID to partition the SIP messaging to the appropriate helper application.

The application interface 35 uses the common user interface 33 to present information to a user. Generally, this information includes error conditions, called party choices, caller ID information about an incoming call, call status, and the like. The application interface 35 uses information provided by the user to configure the way it uses other applications to perform requests initiated from the helper applications 41 and received from the protocol stack 37 for processing. This information is stored in a configuration file (not shown). The configuration file includes, for each of the helper applications 41, an application type field that specifies what features the application will support. Application types include IP phone, browser, e-mail, chat, personal directory, video streaming applications, and the like. These types are mapped to incoming SIP messages and pay loads at call set-up. New application types can be created by the user or downloaded when new applications are developed or supported. The configuration file also includes an application name field for each application, which gives the user the capability to choose from a list of supported applications. The selection auto populates additional information needed to use the appropriate API, pass necessary elements, and path to launch the application if it is currently not running. New applications can be created by the user or down loaded when available.

Figure 3:
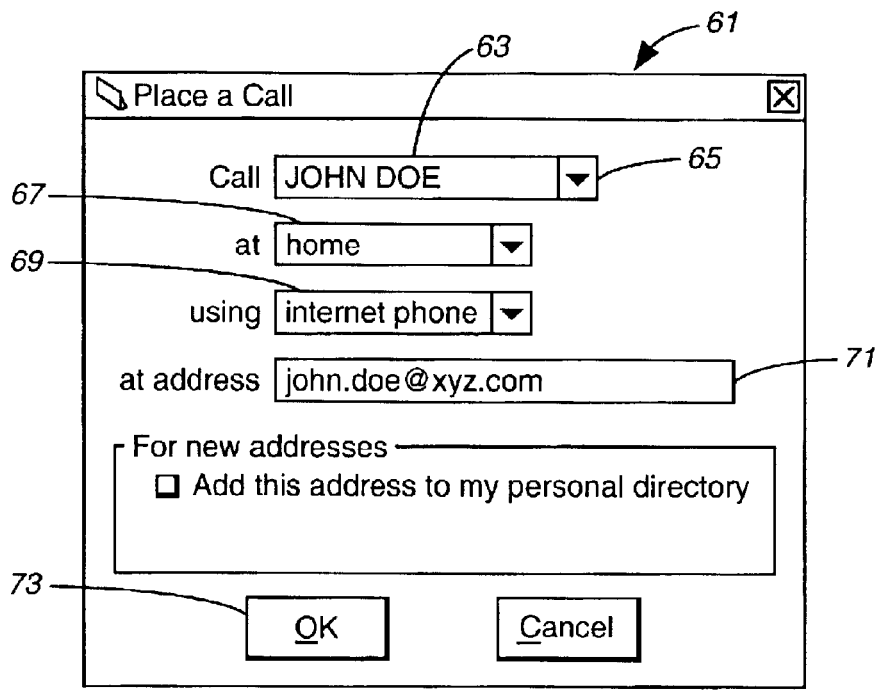
FIG. 3 illustrates a call placement dialog box according to the present invention.

In FIGS. 3–7 there are shown examples of user input dialogs according to the present invention. In FIG. 3 there is shown a call placement dialog box 61, which is displayed to a calling party when the calling party wishes to initiate a call or a session within a call. The call placement dialog box 61 includes a calling party combo box 63. The calling party can enter the name of the called party or select a name from a phone or address book by clicking on a drop down arrow 65. The call placement dialog box 61 also includes a location combo box 67. The calling party can select a location from an existing drop down list or enter a new location. The call placement dialog box 61 includes a media type combo box 69 The calling party can select from a drop list from available helper applications or media. The system 11 of the present invention displays the address that corresponds to the selected media for the selected called party in a box 71. The user interface provides a mechanism by which the calling party can add the called party information to a personal directory.

After the calling party has completed the fields of call placement dialog box 61, the calling party initiates a SIP invite message by clicking on an OK button 73. The calling party client forms a SIP invite message, which includes the identity of the called party, the address of the calling party, a call ID and a session ID. The calling party client then transmits the SIP invite to the called party client.

Figure 4:
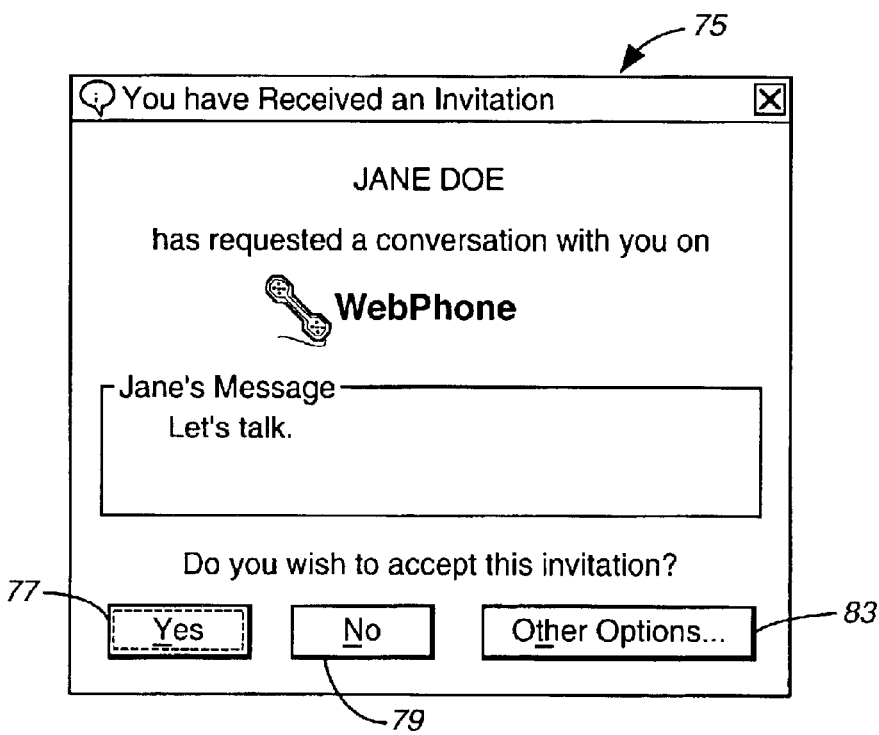
FIG. 4 illustrates an invitation received dialog box according to the present invention.
Figure 7:
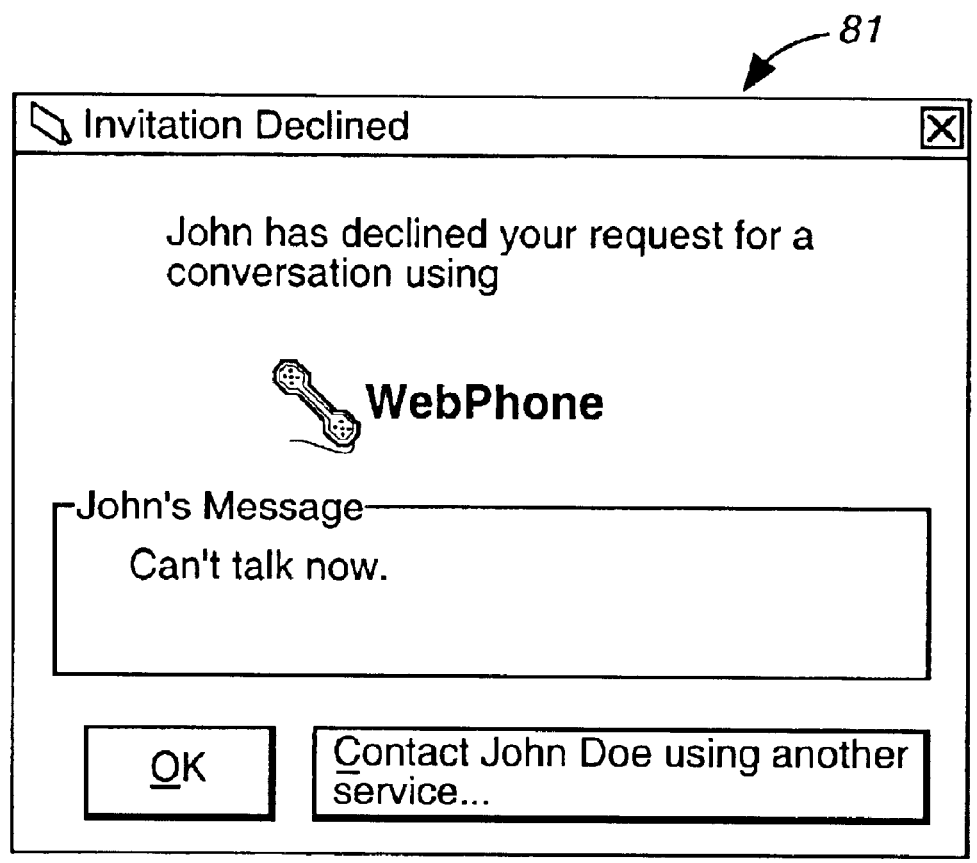
FIG. 7 illustrates an invitation declined dialog box according to the present invention.

When the SIP invite message is received at the called party client, the called party client displays an invitation dialog box 75, which is shown in FIG. 4. The invitation dialog box 75 identifies the calling party and the requested media type. The invitation dialog box 75 allows the called party to accept or decline the invitation, or negotiate for other options. The called party accepts the invitation by clicking on a YES button 77. If the called party accepts the invitation, then a SIP 200 OK response is sent back to the calling party client and both the calling party and called party clients initiate the session by launching the appropriate helper application. The called party declines the invitation by clicking on a NO button 79. If the called party declines the invitation, then the called party client sends back a 63 decline response to the caller. When the calling party client receives a decline response, the calling party client displays an invitation declined dialog box 81, which is shown in FIG. 7.

Figure 5:
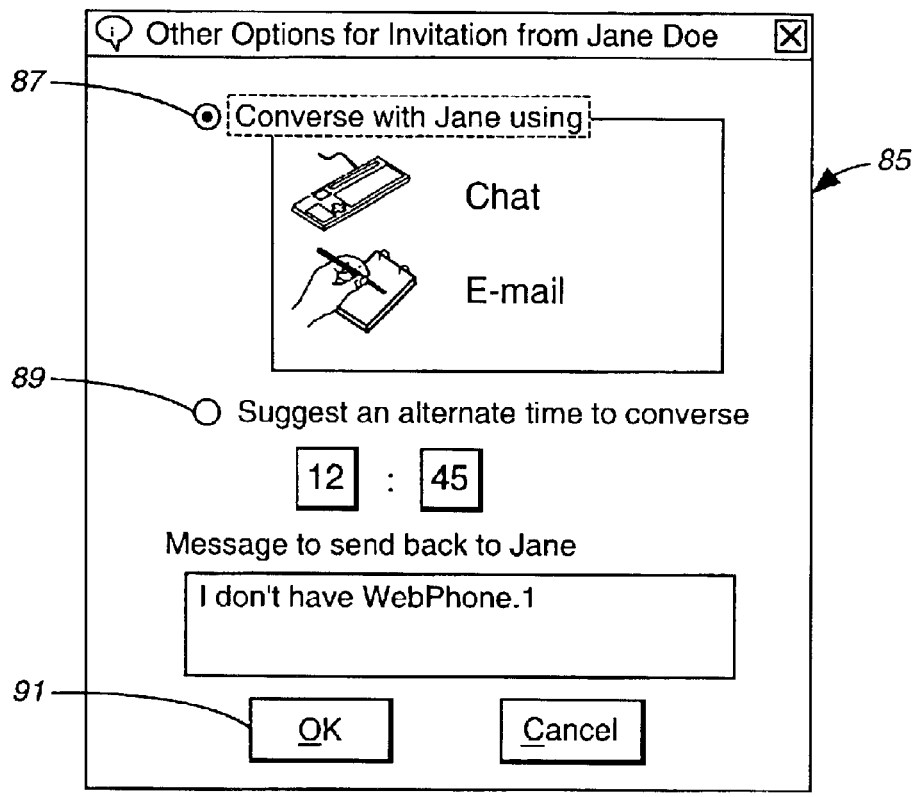
FIG. 5 illustrates another options dialog box according to the present invention.

Referring again to FIG. 4, if the called party wishes to negotiate for a different time or media for the call, the called party clicks on an other options button 83, which causes the called party client to open another options dialog box 85, shown in FIG. 5. The options dialog box 85 gives the called party the opportunity to suggest alternative media or an alternative time for the call. The called party client populates the options dialog box 85 with the names of the other helper applications that the called party has available.

In the example of FIGS. 4 and 5, the calling party suggested using a web phone application for the session. The called party would prefer to conduct the session in chat or e-mail. The called party can suggest that the session be conducted in chat or e-mail by clicking on a radio button 87. Alternatively. the called party can suggest an alternative time by entering the alternative time and clicking on a radio button 89. The called party can also send a text message back to the calling party. After the called party has selected an alternative option for the call, the called party clicks on an OK button 91, which causes the called party client to send a response with the selected option back to the calling party client.

Figure 6:
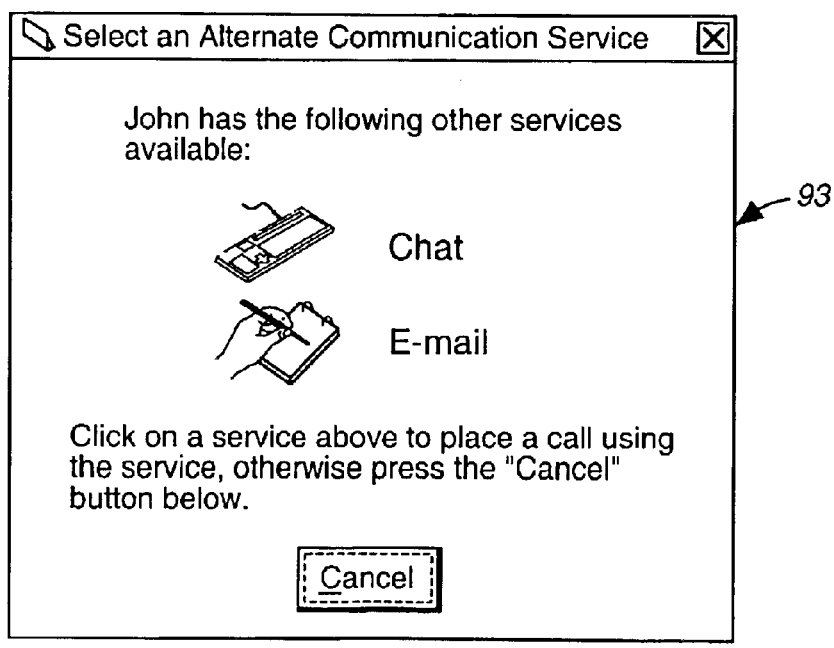
FIG. 6 illustrates an alternate communication service dialog box according to the present invention.

When the calling party client receives the suggested option, the calling party client displays an alternate medium selection dialog box 93, which is shown in FIG. 6. The calling party can select an alternative medium by selecting the appropriate icon. If the calling party selects an alternative medium, an appropriate response is sent back to the called party client and the respective clients initiate the session by launching the appropriate helper applications.

From the foregoing, it may be seen that the present invention provides an improved IP telephony client and system. Multimedia sessions can be launched within calls. Parties can be added to and dropped from calls and sessions easily. New media types can be integrated seamlessly and without having to modify the associated helper applications.

What is claimed is:

1. A method of managing IP telephony sessions between a calling party client and a called party client, comprising:
   displaying a call placement dialog on a user interface of the calling party client, the call placement dialog including fields for designating the called party client and a medium for a session;
   transmitting a session invitation message to the called party client, the session invitation message identifying the calling party client and the designated medium;
   receiving a first response from the called party client including a suggestion to use another medium; and
   sending a second response to the called party client, in response to the receiving the first response, the second response indicating an agreement to use the another medium.

2. The method of claim 1, further comprising displaying an invitation dialog on the user interface of the called party client, the invitation dialog identifying the calling party client and the designated medium.

3. The method of claim 2, wherein the invitation dialog includes user input controls for accepting the invitation, declining the invitation, and choosing other options.

4. The method of claim 1, further comprising launching an appropriate helper application for the another medium at each of the calling party client and the called party client.

5. The method of claim 1, further comprising displaying an other options dialog on the user interface of the calling party client in response to user selection of an other options control.

6. The method of claim 5, wherein the other options dialog includes a user input control for designating alternative media for the session.

7. The method of claim 5, wherein the other options dialog includes a user input control for receiving a suggested alternative time for the session.

8. The method of claim 1, wherein the receiving of the first response from the called party client is in response to the called party client receiving the transmitted session invitation message.

9. The method of claim 1, further comprising displaying an invitation dialog box on the user interface of the called party client, the invitation dialog box identifying the calling party client and the designated medium.

10. A computer program product for enabling a processor in a computer system to implement a system for managing IP telephony sessions between a calling party client and a called party client, said computer program product comprising:
    a computer usable medium having computer readable program code means embodied in said medium for causing a program to execute on the computer system, said computer readable program code means comprising:
    means for enabling the computer system to display a call placement dialog on a user interface of the calling party client, the call placement dialog including fields for designating the called party client and a medium for a session;
    means for enabling the computer system to transmit a session invitation message to the called party client, the session invitation message identifying the calling party client and the designated medium;
    means for enabling the computer system to receive a first response from the called party client including a suggestion to use another medium; and
    means for enabling the computer system to send a second response to the called party client, in response to the receiving the first response, the second response indicating an agreement to use the another medium.

11. The computer program product of claim 10, further comprising means for enabling the computer system to display an invitation dialog on the user interface of the called party client, the invitation dialog identifying the calling party client and the another medium.

12. The computer program product of claim 11, wherein the invitation dialog includes user input controls for accepting the invitation, declining the invitation, and choosing other options.

13. The computer program product of claim 10, further comprising launching an appropriate helper application for the another medium at each of the calling party client and the called party client.

14. The computer program product of claim 10, further comprising means for enabling the computer system to display an other options dialog on the user interface of the calling party client in response to user selection of the other options control.

15. The computer program product of claim 14, wherein the other options dialog includes a user input control for designating alternative media for the session.

16. The computer program product of claim 14, wherein the other options dialog includes a user input control for receiving a suggested alternative time for the session.

17. The computer program product of claim 10, wherein the means for enabling the computer system to receive a first response from the called party is configured to receive the first response in response to the called party client receiving a transmitted session invitation message transmitted via the means for enabling the computer system to transmit a session invitation message to the called party client.

18. The computer program product of claim 10, further comprising means for enabling the computer system to display an invitation dialog box on the user interface of the called party client, the invitation dialog box identifying the calling party client and the another medium.

19. A method of managing IP telephony sessions between a calling party client and a called party client, comprising:

receiving information from a calling party, the information including a designation of the called party client and a medium for a session;

transmitting a session invitation message to the called party client, the session invitation message identifying the calling party client and the designated medium;

receiving a first response from the called party client including a suggestion to use another medium, the receiving of the first response from the called party client being responsive to the called party client receiving the transmitted session invitation message; and sending a second response to the called party client, in response to the receiving the first response, the second response indicating an agreement to use the another medium.

20. The method of claim 19, further comprising launching an appropriate helper application for the another medium at each of the calling party client and the called party client.

21. A computer program product for enabling a processor in a computer system to implement a system for managing IP telephony sessions between a calling party client and a called party client, said computer program product comprising:

a computer usable medium having computer readable program code means embodied in said medium for causing a program to execute on the computer system, said computer readable program code means comprising:

means for enabling the computer system to receive information from a calling party, the information including a designation of the called party client and a medium for a session;

means for enabling the computer system to transmit a session invitation message to the called party client, the session invitation message identifying the calling party client and the designated medium;

means for enabling the computer system to receive a first response from the called party client including a suggestion to use another medium, the means for enabling the computer system to receive a first response from the called party being configured to receive the first response in response to the called party client receiving a transmitted session invitation message transmitted via the means for enabling the computer system to transmit a session invitation message to the called party client; and means for enabling the computer system to send a second response to the called party client, in response to the receiving the first response, the second response indicating an agreement to use the another medium.

22. The computer program product of claim 21, further comprising means for enabling the computer system to launch an appropriate helper application for the another medium at each of the calling party client and the called party client.

* * * * *